UNITED STATES PATENT OFFICE.

DANIEL G. THOMPSON, OF MINNEAPOLIS, MINNESOTA.

IMPROVEMENT IN PRESERVING GREEN CORN, &c.

Specification forming part of Letters Patent No. 150,375, dated April 28, 1874; application filed January 30, 1874.

*To all whom it may concern:*

Be it known that I, D. G. THOMPSON, of Minneapolis, in the county of Hennepin and State of Minnesota, have invented certain new and useful Improvements in Processes for Curing Green Corn, Pease, and String-Beans; and I do hereby declare that the following is a full, clear, and exact description thereof.

My invention relates to the art of preserving green corn, pease, and string-beans, in such a manner that their original freshness and quality may be retained; and it consists in the method of treatment hereinafter described.

To enable others to avail themselves of the benefits arising from my invention, I will now give a detailed statement of my process.

I leave the husks on the corn just as when picked from the stalk, and tie a string around the end of the husks, in order to keep them closed. I then make a pickle by dissolving fifty pounds of rock-salt in as much water as is necessary to make a weak brine, and to this add five pounds of brown sugar; or, I might say, dissolve fifty pounds of salt and five pounds of brown sugar in a cask or other suitable vessel containing about forty gallons of water.

It is not essential to be more definite, only care should be taken not to have the brine so strong that the taste of the corn will thereby be impaired—for instance, it should not be so strong as that in which meat is usually cured.

In this brine I pack the corn, pease, or beans, being careful that the articles to be preserved shall be well covered with the sauce.

It will be found that the corn or vegetables with a covering may be kept as fresh and sweet for a long time as when first pulled.

I am aware that it is not new to preserve green corn with the husk on, submerged in a brine of salt and water. This I do not claim, as I find it necessary to go further, in order that the corn may retain its original flavor and sweetness, and, with this object in view, I first tie the husk, and immerse the whole in a brine composed, as already stated, of water, salt, and sugar, of or about the proportion named. The corn is thus always ready for use without the taste of brine experienced in other cases.

What I claim, and desire to secure by Letters Patent, is—

The process herein described for curing green corn, by immersing it, until wanted for use, in a brine made of water, salt, and sugar, substantially as herein set forth.

In testimony that I claim the foregoing as my own, I affix my signature in the presence of two witnesses.

DANIEL G. THOMPSON.

Witnesses:
JOHN KENNEDY,
J. S. RICH.